(12) United States Patent
Momose

(10) Patent No.: US 9,360,701 B2
(45) Date of Patent: Jun. 7, 2016

(54) LIQUID CRYSTAL DEVICE, ELECTRONIC APPARATUS AND LIGHTING DEVICE

(71) Applicant: SEIKO EPSON CORPORATION, Tokyo (JP)

(72) Inventor: Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 45 days.

(21) Appl. No.: 14/300,829

(22) Filed: Jun. 10, 2014

(65) Prior Publication Data

US 2014/0293191 A1     Oct. 2, 2014

Related U.S. Application Data

(63) Continuation of application No. 13/533,268, filed on Jun. 26, 2012, now Pat. No. 8,755,007.

(30) Foreign Application Priority Data

| Jul. 1, 2011 | (JP) | 2011-147092 |
| Nov. 21, 2011 | (JP) | 2011-253714 |
| Nov. 21, 2011 | (JP) | 2011-253715 |

(51) Int. Cl.
*G02F 1/1335* (2006.01)
*F21V 8/00* (2006.01)

(52) U.S. Cl.
CPC ........ *G02F 1/133524* (2013.01); *G02B 6/0046* (2013.01); *G02B 6/0075* (2013.01); *G02B 6/0078* (2013.01); *G02F 1/133615* (2013.01); *G02B 6/0068* (2013.01); *G02B 6/0073* (2013.01)

(58) Field of Classification Search
CPC .. G02B 6/0068; G02B 6/0028; G02B 6/0046; G02B 6/0078; G02B 6/0073; G02B 6/0076; G02B 6/002; G02B 6/0075; G02B 6/0048; G02B 6/0055; G02B 6/0045; G02B 6/0051; G02B 6/0011; G02B 6/10; G02B 27/0994; G02B 27/09; G02F 1/1335; G02F 1/133615; G02F 1/133606; G02F 1/133603; G02F 1/133524; G02F 1/1336; G02F 1/1333; G02F 1/133504; G02F 1/133553; G02F 1/133605; G02F 2001/133616; H04N 9/315; H04N 9/3152; H01L 33/58; H01L 33/60; G09F 13/18; G09F 13/04; G09F 13/22; B29D 11/00663; G09G 3/3406; H04M 1/22; H04W 52/027

USPC ........ 362/612, 613, 616, 609, 97.1, 555, 610, 362/611, 615, 97.2, 23.1, 619, 623, 628, 362/97.3, 558, 561, 625; 349/65, 61, 62, 349/64, 63, 67; 385/10, 121, 129

See application file for complete search history.

(56) References Cited

U.S. PATENT DOCUMENTS 4,765,718 A * 8/1988 Henkes ............. G02F 1/133524 349/57

(Continued)

FOREIGN PATENT DOCUMENTS

| JP | H02-247687 A | 10/1990 |
| JP | A-10-199318 | 7/1998 |
| JP | A-2001-210122 | 8/2001 |
| JP | A-2004-265798 | 9/2004 |
| JP | A-2006-108045 | 4/2006 |

(Continued)

*Primary Examiner* — Thoi Duong
(74) *Attorney, Agent, or Firm* — Oliff PLC

(57) ABSTRACT

In a liquid crystal device, when the local dimming is adopted, at a light guide plate of a lighting device, light guide plate portions having a trapezoidal planar shape where two sides facing each other in the Y-axis direction have different lengths are arranged in the X-axis direction to have reverse orientations in the Y-axis direction. A light emitting element emits the light of a light source from the end surface of the light guide plate portion which is located at a short side into the light guide plate portion. A light scattering surface is installed at the space between the light guide plate portions.

7 Claims, 9 Drawing Sheets

(56) References Cited

U.S. PATENT DOCUMENTS

| | | |
|---|---|---|
| 6,749,311 B2 | 6/2004 | Suzuki et al. |
| 7,764,334 B2 * | 7/2010 | Kitagawa ............ G02B 6/0068 349/65 |
| 8,089,582 B2 | 1/2012 | Sekiguchi et al. |
| 2007/0188677 A1 | 8/2007 | Souk et al. |
| 2009/0167990 A1 | 7/2009 | Konno et al. |
| 2010/0208211 A1 * | 8/2010 | Paulussen ............ G03B 21/13 353/29 |
| 2011/0109533 A1 | 5/2011 | Suzuki |

FOREIGN PATENT DOCUMENTS

| | | |
|---|---|---|
| JP | A-2006-120361 | 5/2006 |
| JP | A-2009-9080 | 1/2009 |
| JP | 2009-054390 A | 3/2009 |
| JP | A-2009-140663 | 6/2009 |
| JP | A-2009-163902 | 7/2009 |
| JP | 2009-218101 A | 9/2009 |
| JP | A-2009-199926 | 9/2009 |
| WO | 2009/157352 A1 | 12/2009 |
| WO | 2010/141679 A2 | 12/2010 |

* cited by examiner

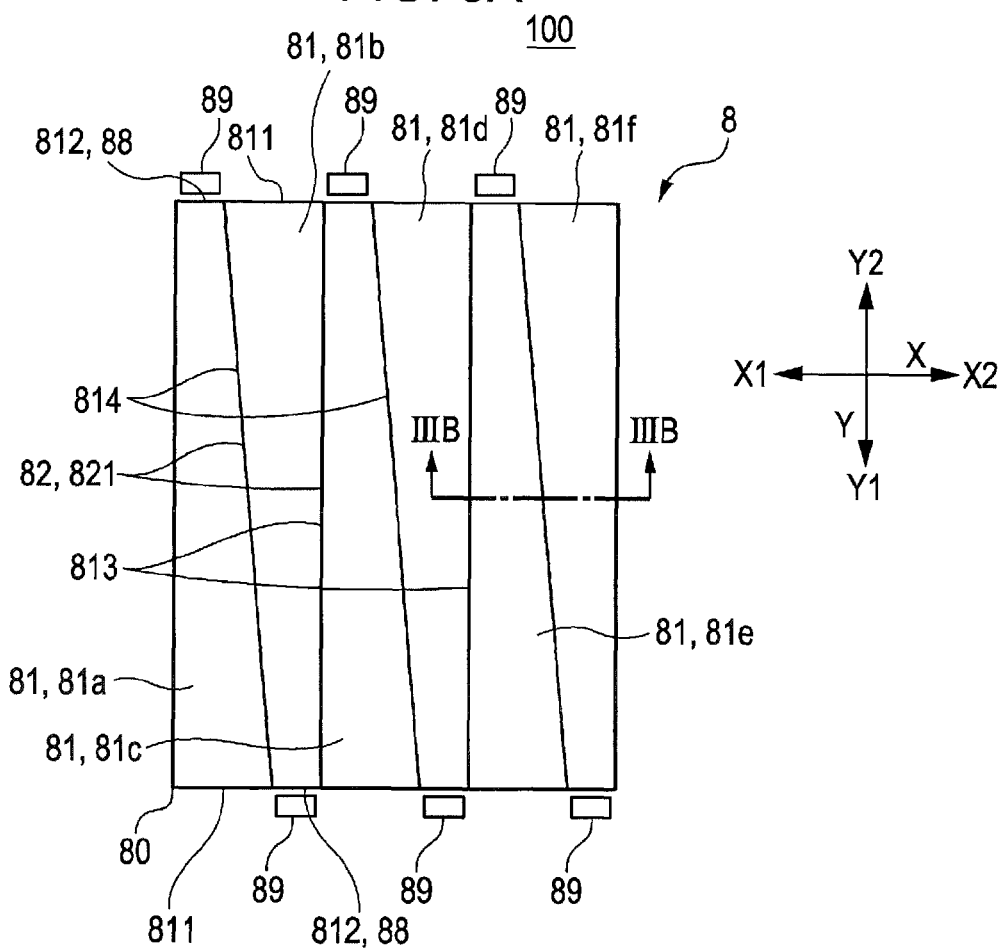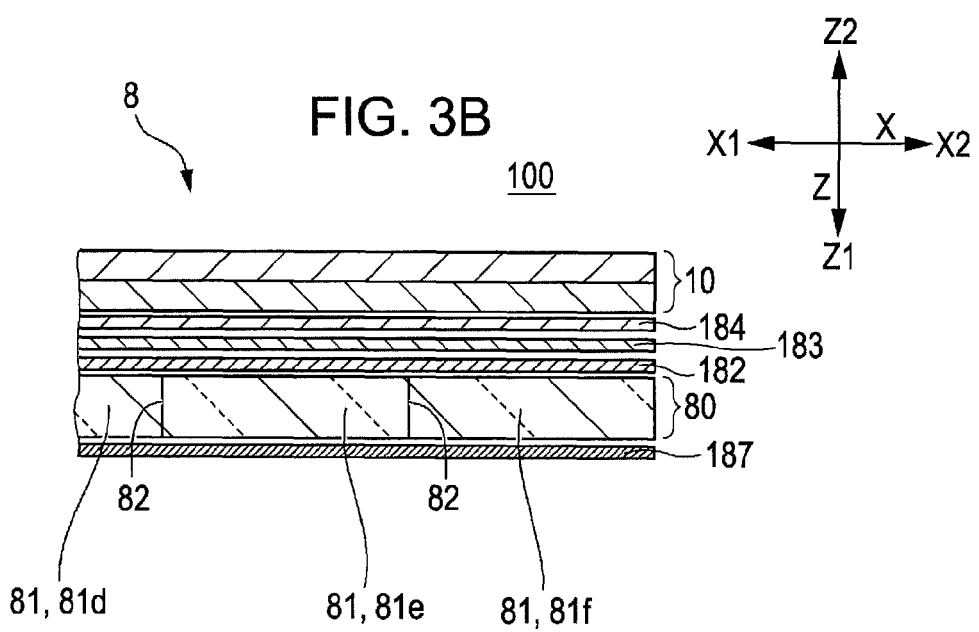

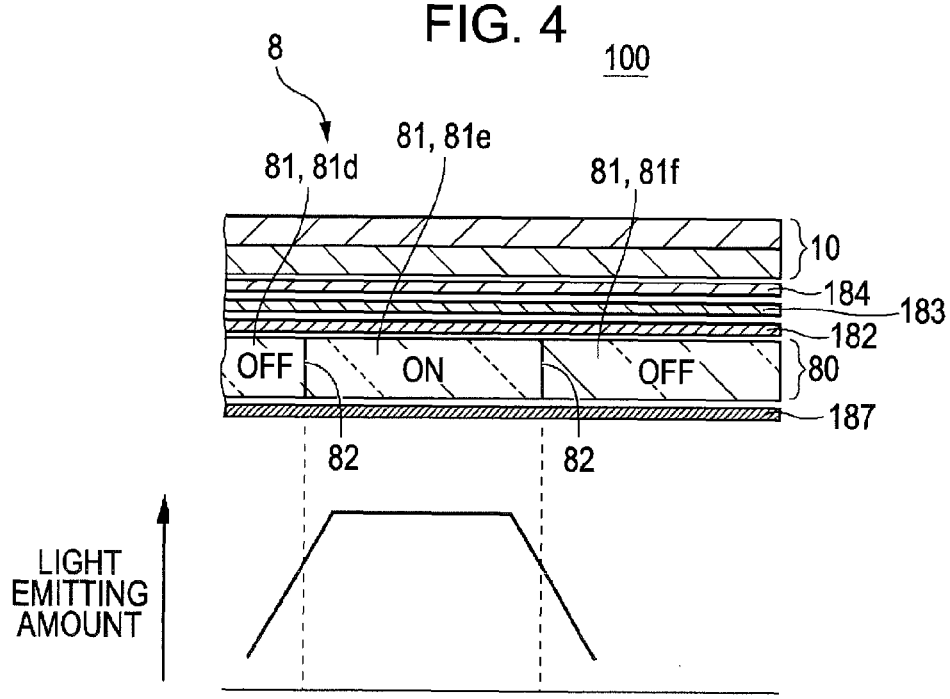
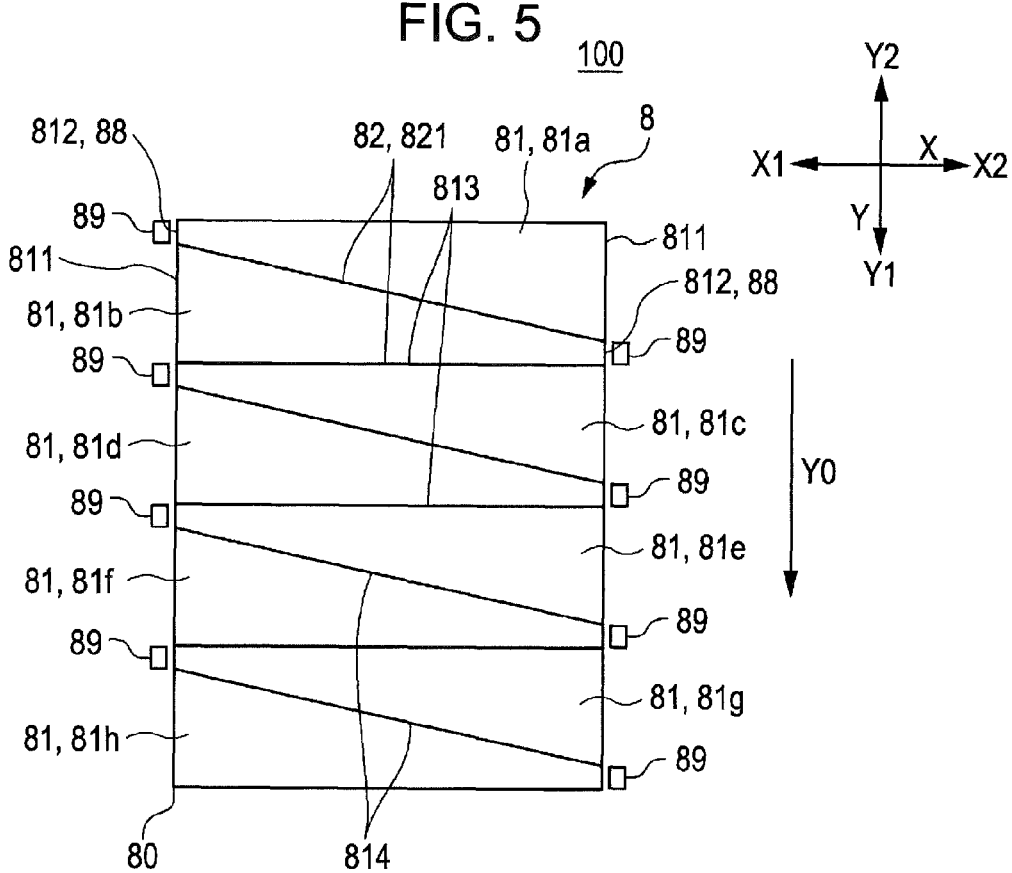

LIQUID CRYSTAL DEVICE, ELECTRONIC APPARATUS AND LIGHTING DEVICE

This is a Continuation of application Ser. No. 13/533,268 filed Jun. 26, 2012, which claims the benefit of Japanese Patent Application Nos. 2011-147092, filed Jul. 1, 2011, 2011-253714, filed Nov. 21, 2011 and 2011-253715, filed Nov. 21, 2011. The disclosure of the prior applications is hereby incorporated by reference herein in its entirety.

BACKGROUND

1. Technical Field

The present invention relates to a liquid crystal device having a lighting device and a liquid crystal panel, an electronic apparatus having the liquid crystal device, and the corresponding lighting device.

2. Related Art

Among various liquid crystal devices, a liquid crystal device having a transparent or translucent liquid crystal panel includes a lighting device, which is called a so-called backlight device, and a liquid crystal panel disposed to overlap the side of a light emitting surface of the lighting device, and modulates the illuminating light emitted from the lighting device by a liquid crystal panel to display an image. Therefore, regarding the lighting device, it is required to make the distribution of emission intensity of the illuminating light uniform.

Here, regarding the lighting device having the light emitting element at the end portion of a light guide plate, it is proposed that a plurality of light emitting elements are provided along two sides facing each other in the first direction of the light guide plate, and the location of the light emitting element disposed along one side and the location of the light emitting element disposed along the other side are shifted in the second direction (see JP-A-2006-120361).

In addition, there is proposed that, since light is excessively dispersed at an integrated light guide plate when the emission intensity of illuminating light emitted from the lighting device is controlled at every region, for example, as shown in FIG. 10A, a plurality of rectangular light guide plate portions 81X extending in the first direction are arranged in parallel in the second direction which is a direction of the short side, and a light emitting element 89 is disposed at the end portion (a light incident portion 88X) of the light guide plate portion 81X in the first direction (see JP-A-2009-163902).

Meanwhile, as shown in FIG. 10B, there is proposed a lighting device in which, even though the emission intensity of illuminating light is not controlled for every region, a plurality of trapezoidal light guide plate portions 82Y having two sides with different lengths facing each other in the first direction are arranged in the second direction which faces the first direction, and the light emitting element 89 is disposed at the end surface (a light incident portion 88Y) located at the long side of a light guide plate portion 82Y (see JP-A-2006-108045).

However, in the case of the lighting device disclosed in JP-A-2009-163902, the size of the light incident portion 88X of the light guide plate portion 81X in the second direction is great in comparison to the size of the light emitting element 89 in the second direction. For this reason, when illuminating light is emitted from the light guide plate portion 81X, near the light incident portion 88X of the light guide plate portion 81X, the emission intensity of the illuminating light from the portion facing the light emitting element 89 is great, but at a position deviated from the corresponding region in the second direction, the emission intensity of the illuminating light may be easily lowered. In addition, in the case of adopting the configuration disclosed in JP-A-2006-108045, since the size of the light incident portion 88Y of the light guide plate portion 82Y in the second direction is great in comparison to the size of the light emitting element 89 in the second direction, further to the lighting device disclosed in JP-A-2009-163902, and so the above problem is remarkable.

Therefore, in the case of adopting the configurations disclosed in JPA-2009-163902 and JP-A-2006-108045, it is required to decrease the dimension of the light guide plate portions 81X and 82Y in the second direction, increase the number of the light guide plate portions 81X and 82Y and the light emitting elements 89, and design the size of the light guide plate portions 81X and 82Y in the second direction close to the size of the light emitting element 89 in the second direction, however, in the corresponding configuration, the cost of the lighting device or the liquid crystal device increases. In addition, in the configurations disclosed in JP-A-2009-163902 and JP-A-2006-108045, decreasing the difference in emission intensity of illuminating light near the light incident portions 88X and 88Y of the light guide plate portions 81X and 82Y by providing the light emitting element 89 at a position greatly spaced from the light incident portions 88X and 88Y of the light guide plate portions 81X and 82Y may be considered, but in the corresponding configuration, the dimension of the lighting device in the first direction becomes great, and so there is a problem that it cannot be mounted to a liquid crystal device.

SUMMARY

An advantage of some aspects of the invention is to provide a liquid crystal device in which the number of light guide plate portions or light emitting elements is relatively low even though a plurality of light guide plate portions extending in the first direction are arranged in parallel in the second direction, and which may promote uniformity of the emission intensity of illuminating light even though the dimension in the first direction is relatively small, an electronic apparatus having the liquid crystal device, and the corresponding lighting device.

According to an aspect of the invention, there is provided a liquid crystal device including a lighting device and a liquid crystal panel disposed to overlap a side of a light emitting surface of the lighting device, and the lighting device includes a light guide plate in which a plurality of plane-shaped light guide plate portions, each having a first side facing at least the first direction between the first direction and the second direction which intersect each other in the in-plane direction of the light emitting surface and a second side longer than the length of the first side, are arranged so that the first side and the second side of light guide plate portions adjacent to each other in the second direction become adjacent to each other, respectively; and a plurality of light emitting elements for emitting the light of a light source from the end surface of the first side into the light guide plate portion with respect to each of the plurality of light guide plate portions.

In the liquid crystal device according to the invention, in linkage with the driving of the liquid crystal panel, when the emission intensity of illuminating light from a lighting device is controlled for each region, the light guide plate portions having a planar shape where two sides facing each other in the first direction have different lengths are arranged in the second direction to have reverse orientations in the first direction, and the light of the light source emitted from the light emitting element is incident from the end surface of the light guide plate portion located in the first direction into the light guide plate portion. For this reason, different from the case where an integrated light guide plate is used, it is possible to prevent the light of the light source from spreading too much, and so the emission intensity of illuminating light may be very suitably controlled at each region. Here, the light emitting element emits the light of the light source from the end surface of the light guide plate portion located at the first side (the short side), among two faces facing in the first direction, into the light guide plate portion. For this reason, in the light guide plate portion, it is possible to avoid the size of the end surface (the light incident portion) in the second direction where the light of the light source is incident increasing excessively in comparison to the size of the light emitting element in the second direction. Therefore, even though the light emitting element is not excessively separated from the light incident portion of the light guide plate portion in the first direction, the difference in incident intensity of the light of the light source is small between the region of the light guide plate portion which faces the light emitting element and a location deviated from the region in the second direction. Therefore, when the illuminating light is emitted from the light guide plate portion, in the vicinity of the light incident portion of the light guide plate portion, the difference between the emission intensity of illuminating light from the region facing the light emitting element and the emission intensity of illuminating light from a location deviated from the region in the second direction is small. Therefore, even though the plurality of light guide plate portions extending in the first direction are arranged in the second direction, the emission intensity of illuminating light may be made uniform even though the number of light guide plate portions or light emitting elements is relatively small and the dimension of the lighting device in the first direction is relatively small.

In the invention, the light guide plate portion may adopt a configuration having a trapezoidal planar shape where the first side and the second side are parallel. According to this configuration, since the light emitting elements are configured to be arranged linearly in the second direction at both sides of the light guide plate in the first direction, the configuration may be simplified, for example substrates on which the light emitting elements are mounted may be arranged in succession linearly.

It is preferable that the light guide plate portion adopt a configuration including an oblique side extending in the first direction and combining one end portion of the first side and one end portion of the second side, and a lateral side extending to be perpendicular to the first side and the second side and combining the other end portion of the first side and the other end portion of the second side. According to this configuration, by arranging the light guide plate portions so that the lateral side orthogonal to two parallel sides is disposed at an outer side in the second direction, the light guide plate may have a rectangular shape.

It is preferable that a light scattering surface be installed between adjacent light guide plate portions among the plurality of light guide plate portions. According to this configuration, since a part of the light leaks from the light guide plate portion to an adjacent light guide plate portion via the light scattering surface, it is possible to prevent an abrupt change of the emission intensity of illuminating light at a border portion of the light guide plate portions adjacent to each other.

It is preferable that, between adjacent light guide plate portions among the plurality of light guide plate portions, the light scattering surface be installed at a part of the light guide plate portion in the thickness direction, and a reflecting surface be installed at the other part thereof. According to this configuration, if the ratio occupied by the light scattering surface and the reflecting surface is adjusted, the intensity of light leaking from the light guide plate portion to an adjacent light guide plate portion and the intensity of light reflected on the reflecting surface to return to the light guide plate portion may be adjusted. Therefore, it is possible to prevent an abrupt change of the emission intensity of illuminating light at the border portion of the light guide plate portion adjacent to each other, and the intensity of illuminating light emitted from the light guide plate portion may be optimized.

It is preferable that, between adjacent light guide plate portions among the plurality of light guide plate portions, the light scattering surface be installed at a part of the light guide plate portion in the thickness direction, and a clearance be provided at the other part thereof. According to this configuration, reflection occurs at the interface between the end surface of the light guide plate portion and the air layer in the clearance, and a part of the light is incident to an adjacent light guide plate portion via the clearance. Therefore, if a ratio occupied by the light scattering surface and the clearance is adjusted, the intensity of light leaking from the light guide plate portion to an adjacent light guide plate portion and the intensity of light reflected on the interface between the end surface of the light guide plate portion and the air layer in the clearance to return to the light guide plate portion may be adjusted. Therefore, it is possible to prevent an abrupt change of the emission intensity of illuminating light at the border portion of the light guide plate portion adjacent to each other, and the intensity of illuminating light emitted from the light guide plate portion may be optimized.

It is preferable that a clearance be provided between adjacent light guide plate portions among the plurality of light guide plate portions. According to this configuration, reflection occurs at the interface between the end surface of the light guide plate portion and the air layer in the clearance, and a part of the light is incident to an adjacent light guide plate portion via the clearance. Therefore, it is possible to prevent an abrupt change of the emission intensity of illuminating light at the border portion of the light guide plate portion adjacent to each other, and the intensity of illuminating light emitted from the light guide plate portion may be optimized.

It is preferable that the thickness dimension of the plurality of light guide plate portions continuously vary in the first direction.

In this case, it is preferable that the thickness dimension of the plurality of light guide plate portions increase from the side of the second side toward the side of the first side. According to this configuration, since the incident light of the light source may easily reach the front end side of the light guide plate portion while keeping a sufficient intensity of light, the emission intensity of illuminating light emitted from the light guide plate portion may be made uniform.

It is preferable that the plurality of light guide plate portions be arranged so that the first side and the second side of adjacent light guide plate portions are adjacent to each other, respectively. According to this configuration, since the advancing direction of the light of the light source in the first direction in the light guide plate changes in the second direction alternately, it has the advantage that brightness unevenness does not easily occur in the light guide plate.

The liquid crystal device according to the invention may be used as a display unit of various kinds of electronic apparatuses.

According to another aspect of the invention, there is provided a lighting device including a light guide plate in which a plurality of plane-shaped light guide plate portions, each having a first side facing at least the first direction between the first direction and the second direction which intersect each other in the in-plane direction of the light emitting surface and a second side longer than the length of the first side, are arranged so that the first side and the second side of light guide plate portions adjacent to each other in the second direction become adjacent to each other, respectively; and a plurality of light emitting elements for emitting the light of a light source from the end surface of the first side into the light guide plate portion with respect to each of the plurality of light guide plate portions.

In the lighting device according to the invention, when the emission intensity of illuminating light is controlled for each region, the light guide plate portions having a planar shape where two sides facing each other in the first direction have different lengths are arranged in the second direction to have reverse orientations in the first direction, and the light of the light source emitted from the light emitting element is incident from the end surface of the light guide plate portion located in the first direction into the light guide plate portion. For this reason, different from the case where an integrated light guide plate is used, it is possible to prevent the light of the light source from spreading too much, and so the emission intensity of illuminating light may be very suitably controlled at each region. Here, the light emitting element emits the light of the light source from the end surface of the light guide plate portion located at the first side (the short side), among two faces facing in the first direction, into the light guide plate portion. For this reason, in the light guide plate portion, it is possible to avoid the size of the end surface (the light incident portion) in the second direction where the light of the light source is incident increasing excessively in comparison to the size of the light emitting element in the second direction. Therefore, even though the light emitting element is not excessively separated from the light incident portion of the light guide plate portion in the first direction, the difference in incident intensity of the light of the light source is small between the region of the light guide plate portion which faces the light emitting element and a location deviated from the region in the second direction. Therefore, when the illuminating light is emitted from the light guide plate portion, in the vicinity of the light incident portion of the light guide plate portion, the difference between the emission intensity of illuminating light from the region facing the light emitting element and the emission intensity of illuminating light from a location deviated from the region in the second direction is small. Therefore, even though the plurality of light guide plate portions extending in the first direction are arranged in the second direction, the emission intensity of illuminating light may be made uniform even though the number of light guide plate portions or light emitting elements is relatively small and the dimension of the lighting device in the first direction is relatively small.

BRIEF DESCRIPTION OF THE DRAWINGS

The invention will be described with reference to the accompanying drawings, wherein like numbers reference like elements.

FIGS. 3A and 3B are diagrams showing an essential configuration of a lighting device according to the first embodiment of the invention.

FIG. 4 is a diagram showing the emission intensity when illuminating light is emitted from one of the light guide plate portions of the lighting device according to the first embodiment of the invention.

FIG. 5 is a diagram showing a planar configuration of a lighting device according to a second embodiment of the invention.

DESCRIPTION OF EXEMPLARY EMBODIMENTS

Figure 1A:
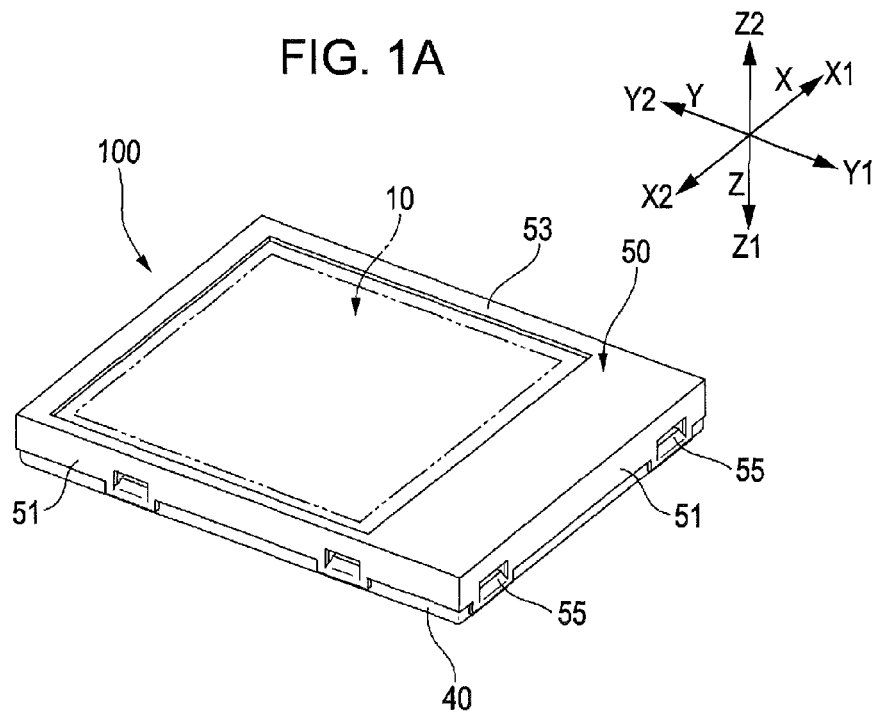
FIGS. 1A and 1B are diagrams showing an overall configuration of a liquid crystal device according to a first embodiment of the invention.

Referring to the drawings, embodiments of the invention will be described. In addition, in regard to the figures referred to in the following description, the scale of each layer or member may be changed so that each layer or member may be so increased to be recognizable on the figures. In addition, in the following description, the directions intersecting the in-plane direction of a light guide plate or a liquid crystal panel are set to be the X-axis direction and the Y-axis direction, and the direction intersecting with the X-axis direction and the Y-axis direction is set to be the Z-axis direction. In addition, in the drawings referred to below, one side in the X-axis direction is set to be an X1 side and the other side is set to be an X2 side, one side in the Y-axis direction is set to be a Y1 side and the other side is set to be a Y2 side, and one side in the Z-axis direction is set to be a Z1 side (lower side) and the other side (the side where illuminating light or display light is emitted) is set to be a Z2 side (upper side).

Embodiment 1

Overall Configuration

Figure 1B:
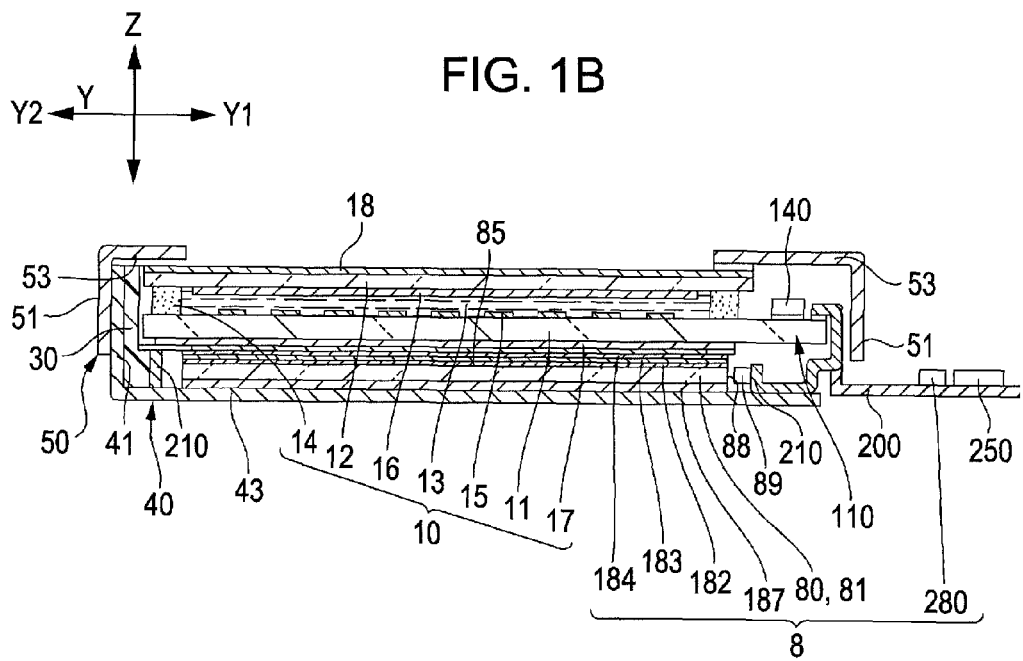
Figure 2:
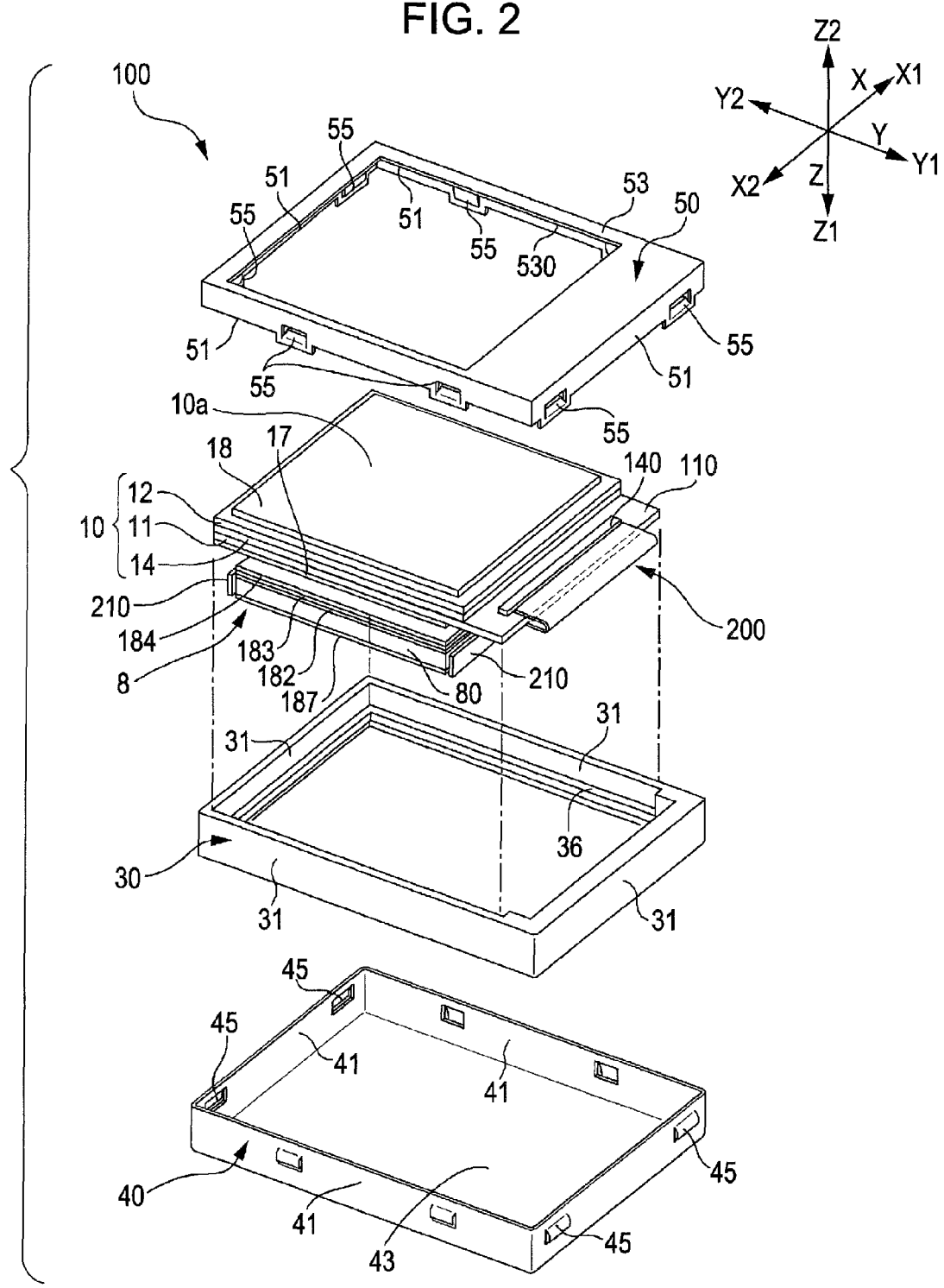
FIG. 2 is an exploded perspective view showing the liquid crystal device according to the first embodiment of the invention.

FIGS. 1A and 1B are diagrams showing an overall configuration of a liquid crystal device according to the first embodiment of the invention, where FIG. 1A is a perspective view showing an appearance of the liquid crystal device and FIG. 1B is a cross-sectional view showing the liquid crystal device. FIG. 2 is an exploded perspective view showing the liquid crystal device according to the first embodiment of the invention.

In FIGS. 1A, 1B and 2, the liquid crystal device 100 of this embodiment generally includes a lighting device 8 generally called a so-called backlight, and a transparent-type or translucent-type liquid crystal panel 10 disposed to overlap the surface of the lighting device 8. In this embodiment, the liquid crystal panel 10 is made of a transparent-type liquid crystal panel. In addition, the liquid crystal device 100 includes a resin frame 30 made of resin and supporting the liquid crystal panel 10 and the lighting device 8 inwards, a lower frame 40 disposed at a lower side of the resin frame 30 (the side opposite to the display surface/one size Z1 in the Z-axis direction), and an upper frame 50 disposed at an upper side of the resin frame 30 (the side of the display surface/the other side Z2 in the Z-axis direction). The resin frame 30 and the lower frame 40 may be integrally formed by means of insert molding or outsert molding.

The liquid crystal panel 10 includes an element substrate 11 having a rectangular planar shape where a pixel electrode 15 or the like is formed, an opposite substrate 12 opposite to the element substrate 11 via a predetermined clearance, and a sealant 14 for joining the opposite substrate 12 and the element substrate 11. In the liquid crystal panel 10, a liquid crystal layer 13 is retained in the region surrounded by the sealant 14. The element substrate 11 and the opposite substrate 12 are made of a translucent substrate, such as a glass substrate. In the element substrate 11, a plurality of scan lines (not shown) extend in the X-axis direction, and a plurality of data lines extend in the Y-axis direction, so that switching elements (not shown) and pixel electrodes 15 are installed corresponding to intersections between the scan lines and the data lines (not shown).

In this embodiment, the opposite substrate 12 is disposed at an emission side of display light, and the element substrate 11 is disposed at a side of the lighting device 8. The liquid crystal panel 10 includes a liquid crystal panel of a TN (Twisted Nematic) type, an ECB (Electrically Controlled Birefringence) type, or a VAN (Vertical Aligned Nematic) type, the pixel electrode 15 is formed at the element substrate 11, and a common electrode 16 is formed at the opposite substrate 12. In this embodiment, the liquid crystal panel 10 is 3.5 inches diagonally and has 320×480 pixels. In addition, in the case where the liquid crystal panel 10 is a liquid crystal panel of an IPS (In Plane Switching) type or a FFS (Fringe Field Switching) type, the common electrode 16 is installed at a side of the element substrate 11. In addition, the element substrate 11 may also be disposed at an emission side of display light with respect to the opposite substrate 12. An upper polarization plate 18 is disposed to overlap the surface of the liquid crystal panel 10, and a lower polarization plate 17 is disposed between the lower surface of the liquid crystal panel 10 and the lighting device 8.

In the element substrate 11, a driving IC 140 is mounted on the surface of an overhanging portion 110 from the circumference of the opposite substrate 12, and a flexible substrate 200 is connected to the end portion of the overhanging portion 110. In the flexible substrate 200, a display controlling IC 250 for outputting image data to the liquid crystal panel 10 and a light source driving IC 280 (a light source driving unit) for controlling lighting of the lighting device 8 are mounted.

In this embodiment, the light source driving IC 280 is coupled with the driving of the liquid crystal panel 10, and controls the emission intensity of illuminating light from the lighting device 8 at every region. In more detail, the liquid crystal device 100 of this embodiment adopts a local dimming method in which the emission intensity of illuminating light from the lighting device 8 is great in the region where an image with high brightness is displayed to the liquid crystal panel 10, and the emission intensity of illuminating light from the lighting device 8 is low in the region where an image with low brightness is displayed. The above operation is performed as, under the control of the display controlling IC 250, the light source driving IC 280 controls the driving current of a light emitting element 89 using the lighting device 8.

The lighting device 8 includes a rectangular light guide plate 80 disposed to overlap the lower surface side of the liquid crystal panel 10, and a light emitting element 89 such as an LED for emitting white light, and the light guide plate 80 is a translucent resin plate made of resin or the like, such as an acrylic resin and a polycarbonate resin. The flexible substrate 200 connected to the liquid crystal panel 10 is a double-sided substrate, and the light emitting element 89 is mounted to a band-shaped portion 210 or the like extending to the flexible substrate 200. As described in detail later, since the light guide plate 80 has a light incident portion 88, the light of the light source emitted from the light emitting element 89 is incident to the light guide plate 80 from the light incident portion 88, and is then emitted as illuminating light from the light emitting surface 85 of the surface while moving in the light guide plate 80. In addition, in the lighting device 8, a reflection sheet 187 is disposed to overlap the lower surface of the light guide plate 80, and optical sheets such as a diffusion sheet 182 and prism sheets 183 and 184 are disposed to overlap the surface of the light guide plate 80. In this embodiment, two prism sheets 183 and 184 are disposed so that their edge lines are orthogonal to each other. For this reason, the illuminating light emitted from the light emitting surface 85 of the light guide plate 80 is diffused in all directions by the diffusion sheet 182, and is then endowed with directivity with a peak in the front direction of the liquid crystal panel 10 by the two prism sheets 183 and 184.

In this way, in this embodiment, the lighting device 8 is configured with the light guide plate 80, the light emitting element 89, the band-shaped portion 210 of the flexible substrate 200, the optical sheets (the reflection sheet 187, the diffusion sheet 182, the prism sheets 183 and 184), and the light source driving IC 280 (the light source driving unit). Here, the band-shaped portion 210 of the flexible substrate 200 extends along two sides of the light guide plate 80 which face each other, and as described later with reference to FIGS. 3A and 3B, the light emitting element 89 is disposed along two sides of the light guide plate 80 which face each other. The light source driving IC 280 (the light source driving unit) selectively drives the plurality of light emitting elements 89 in linkage with the driving of the liquid crystal panel and controls the emitted intensity of illuminating light emitted from the light emitting surface for each of the plurality of light guide plate portions.

In addition, the resin frame 30 has a rectangular frame shape and has four sidewalls 31 facing the lateral end portion of the liquid crystal panel 10. A stepped portion 36 is formed inside three sidewalls 31, among four sidewalls 31 above. On the stepped portion 36, the liquid crystal panel 10 is fixed by means of a double-sided tape or the like so that the light guide plate 80 or the light emitting element 89 of the lighting device 8 is disposed inside the stepped portion 36. The lower frame 40 is formed by performing a pressing process or the like to a thin metal plate, such as a SUS plate. The lower frame 40 has a lower plate portion 43 and four side plate portions 41 upright from the outer circumference of the lower plate portion 43 and has a rectangular box shape where the upper surface is opened. The resin frame 30 is retained on the lower plate portion 43 of the lower frame 40. The upper frame 50 is also formed by performing a pressing process or the like to a thin metal plate such as a SUS plate, similar to the lower frame 40. The upper frame 50 has a rectangular upper plate portion 53 and four side plate portions 51 bent downwards from the outer circumference of the upper plate portion 53 and having a rectangular box shape where the lower surface is opened. The side plate portion 51 covers the lateral end portion of the liquid crystal panel 10, and the upper plate portion 53 covers the display light emission side of the liquid crystal panel 10. Here, at the upper plate portion 53 of the upper frame 50, a rectangular opening 530 for emitting the light emitted from the liquid crystal panel 10 is formed. For this reason, the upper plate portion 53 of the upper frame 50 entirely covers the circumferential end portion of the liquid crystal panel 10 at the display light emission side. In the lower frame 40, a hook portion 45 formed by cutting and erecting the side plate portion 41 to have a downward slope is formed at the side plate portion 41, and in the upper frame 50, a hook portion 55 formed by cutting and erecting the side plate portion 51 to have an upward slope is formed at the side plate portion 51. For this reason, in a state where the lower frame 40 and the upper frame 50 overlap the liquid crystal panel 10, the lighting device 8 and the resin frame 30, if the upper frame 50 is pressed toward the lower frame 40, the hook portions 45 and 55 are automatically engaged, so that the upper frame 50 and the lower frame 40 come to be coupled with the side plate portions 41 and 51.

Detailed Configuration of the Lighting Device 8

FIGS. 3A and 3B are diagrams showing an essential configuration of a lighting device 8 according to the first embodiment of the invention, where FIG. 3A is a diagram showing a planar configuration of the lighting device 8 and FIG. 3B is a diagram showing a cross-sectioned view of the lighting device 8, taken along the line IIIB-IIIB. In addition, in the following description, the first direction, the second direction and the third direction will correspond to the following directions:
the first direction=the Y-axis direction,
the second direction=the X-axis direction, and
the third direction=the Z-axis direction.

In addition, the "first side" corresponds to a short side 812, and the "second side" corresponds to a long side 811.

As shown in FIGS. 3A and 3B, in the lighting device 8 of this embodiment, at the light guide plate 80, a plurality of light guide plate portions 81 (81a to 81f) having a trapezoidal planar shape where two sides facing in the Y-axis direction have different lengths, among the Y-axis direction (the first direction) and the X-axis direction (the second direction) intersecting with the in-plane direction of the light emitting surface 85, are disposed in parallel in the X-axis direction, and light emitting elements 89 are disposed in a one-to-one relationship with the light guide plate portions 81. In this embodiment, the light emitting element 89 is an LED (Light Emitting Diode) which emits white light and emits light of a light source as emission light.

Here, the plurality of light guide plate portions 81 are arranged alternately in the X-axis direction while reversing orientations in the Y-axis direction. For this reason, among the plurality of light guide plate portions 81, each of the light guide plate portions 81 adjacent to each other have reversed orientations in the Y-axis direction. In more detail, among the plurality of light guide plate portions 81, between two sides of the light guide plate portion 81a, 81c, 81e which face each other in the Y-axis direction, the long side 811 is oriented toward one side Y1 in the Y-axis direction, and the short side 812 is oriented toward the other side Y2 in the Y-axis direction. By doing so, in the light guide plate portions 81b, 81d, 81f, the long side 811 is oriented toward the other side Y2 in the Y-axis direction, and the short side 812 is oriented toward one side Y1 in the Y-axis direction. In addition, all of the plurality of light guide plate portions 81 have the same shape and includes a lateral side 813 extending in a direction orthogonal to the long side 811 and the short side 812 and coupling the end portions of the long side 811 and the short side 812 and an oblique side 814 extending with a slope and coupling the other end portions of the long side 811 and the short side 812. For this reason, if two light guide plate portions 81a and 81b are arranged so that their oblique sides 814 adjoin each other, the light guide plate portions 81a and 81b becomes a rectangle extending toward the long side in the Y-axis direction. In addition, it is the same as the other light guide plate portions (the light guide plate portions 81c and 81d and the light guide plate portions 81e and 81f). For this reason, by disposing two light guide plate portions 81, which are combined so that their oblique sides 814 adjoin each other, in the Y-axis direction, it is possible to configure a light guide plate 80 with a rectangular planar shape.

In this embodiment, the light guide plate portion 81 has, for example, a thickness dimension of 1 mm and a length dimension of 75 mm in the Y-axis direction, the long side 811 having a length of 13 mm, the short side 812 having a length of 4 mm. For this reason, the light guide plate has a planar size of 51 mm×75 mm.

When arranging the light emitting element 89 at the light guide plate 80 configured as above, in this embodiment, at any of the plurality of light guide plate portions 81, the end surface located at the short side 812 side becomes the light incident portion 88, so that the light emission surface of the light emitting element 89 is oriented toward the light incident portion 88. In addition, with respect to the light guide plate portion 81, at the surface where the reflection sheet 187 is located, a scattering pattern is formed, and in this embodiment, the further spaced apart from the light emitting element 89, the more density of the scattering pattern increases. For this reason, the distribution of intensity of illuminating light emitted from the light guide plate portion 81 is made uniform regardless of the distance from the light emitting element 89. The scattering pattern is configured to have concave depressions in the surface of the light guide plate portion, but a configuration where a scattering member is printed may also be adopted.

In this embodiment, the plurality of light guide plate portions 81 are respectively made of independent resin plates, and the end surface corresponding to the lateral side 813 and the oblique side 814 becomes a light scattering surface 821 to which fine unevenness is added by means of scattering. For this reason, the light scattering surface 821 is installed at the space 82 between the light guide plate portions 81 adjacent to each other in the Y-axis direction. In this regard, the end surface of the light guide plate portion 81 at the short side 812 regarded as the light incident portion 88 becomes a flat surface without a scattering treatment for the purpose of enhancing the incident efficiency of light of the light source into the light guide plate portion 81. In addition, the end surface of the light guide plate portion 81 at the long side 811, which faces the light incident portion 88, becomes a flat surface, and therefore the light reaching the end surface at the long side 811 is reflected to propagate in the light guide plate portion 81 again.

Emission Characteristics of Illuminating Light

FIG. 4 is a diagram showing the emission intensity when illuminating light is emitted from one of the light guide plate portions 81 of the lighting device 8 according to the first embodiment of the invention. The liquid crystal device 100 of this embodiment adopts a local dimming method so that the lighting device 8 sets the emission intensity of illuminating light to be great in the region where an image with high brightness is displayed to the liquid crystal panel 10, and the lighting device 8 sets the emission intensity of illuminating light to be low in the region where an image with low brightness is displayed. In the above lighting operation, for example, as shown in FIG. 4, the light emitting element 89 installed at the light guide plate portion 81e among the plurality of light guide plate portions 81 illuminates, and the light emitting elements 89 at both sides do not emit light.

In this case, first, the light guide plate portion 81e emits illuminating light with uniform intensity regardless of location. Here, the plurality of light guide plate portions 81 are respectively made of independent resin plates, and the end surface corresponding to the lateral side 813 and the oblique side 814 becomes a scattering surface. For this reason, a part of the light progressing in the light guide plate portion 81e is emitted from the end surface corresponding to the lateral side 813 and the oblique side 814 and is incident to adjacent light guide plate portions 81d and 81f. For this reason, the emission intensity of illuminating light gently decreases the space (the border portion) 82 between the light guide plate portions 81 adjacent to each other, thereby preventing an abrupt change.

Main Effects of this Embodiment

As described above, in this embodiment, the local dimming is adopted to improve the contrast of an image and promote low power consumption, and the light guide plate portions 81 having a trapezoidal planar shape where two sides facing in the Y-axis direction (the first direction) have different lengths are arranged in the X-axis direction (the second direction) while reversing orientations in the Y-axis direction. In addition, the light of the light source emitted from the light emitting element 89 is incident into the light guide plate portion 81 from the end surface of the light guide plate portion 81 located in the Y-axis direction. For this reason, different from the case where an integrated light guide plate is used, it is possible to prevent the light of the light source from spreading too much, and so the emission intensity of illuminating light may be very suitably controlled at each region.

Here, the light emitting element 89 emits the light of the light source into the light guide plate portion 81 from the end surface of the light guide plate portion 81 located at the short side 812 side. For this reason, in the light guide plate portion 81, it is possible to avoid the size of the end surface (the light incident portion 88) in the X-axis direction where the light of the light source is incident increasing excessively in comparison to the size of the light emitting element 89 in the X-axis direction. Therefore, even though the light emitting element 89 is not excessively separated from the light incident portion 88 of the light guide plate portion 81, the difference in incident intensity of the light of the light source is small between the region of the light guide plate portion 81 which faces the light emitting element 89 and a location deviated from the region in the X-axis direction. Therefore, when the illuminating light is emitted from the light guide plate portion 81, in the vicinity of the light incident portion 88 of the light guide plate portion 81, the difference between the emission intensity of illuminating light from the region facing the light emitting element 89 and the emission intensity of illuminating light from a location deviated from the region in the X-axis direction is small. Therefore, even though the plurality of light guide plate portions 81 extending in the Y-axis direction are arranged in the X-axis direction, the emission intensity of illuminating light may be made uniform in a state where the number of light guide plate portions 81 or light emitting elements 89 is relatively small and the dimension of the lighting device 8 in the Y-axis direction is relatively small.

In addition, in this embodiment, since the light scattering surface 821 is installed at the space 82 between the light guide plate portions 81 adjacent to each other, a part of the light leaks from the light guide plate portions 81 to an adjacent light guide plate portion 81. For this reason, it is possible to suppress an abrupt change of the emission intensity of illuminating light at a border portion of adjacent light guide plate portions 81. Therefore, a high-quality image may be displayed.

In addition, since the plurality of light guide plate portions 81 have a trapezoidal planar shape where two sides (the long side 811 and the short side 812) are parallel, the light emitting elements 89 are configured to line up in the X-axis direction at both sides of the light guide plate 80 in the Y-axis direction. Therefore, it is possible to attempt simplification of the configuration, for example substrates (the band-shaped portions 210 of the flexible substrates 200) where the light emitting elements 89 are mounted may be provided linearly in succession. Further, the plurality of light guide plate portions 81 has the oblique side 814 and the lateral side 813 provided in successions to be orthogonal to two sides (the long side 811 and the short side 812). For this reason, by arranging the light guide plate portion 81 so that the lateral side 813 is located outside, the light guide plate 80 may have a rectangular shape.

In addition, in this embodiment, even though, when the light scattering surface 821 is provided to the space 82 between the light guide plate portions 81 adjacent to each other in the Y-axis direction, both the lateral side 813 and the oblique side 814 serve as the light scattering surface 821, it is also possible to adopt a configuration where the lateral side 813 or the oblique side 814 of one light guide plate portion 81 among the light guide plate portions 81 adjacent to each other in the Y-axis direction serves as the light scattering surface 821. In this configuration, since it is configured so that the light scattering surface 821 is used together between the light guide plate portions 81 adjacent to each other in the Y-axis direction, the same effects as when both the lateral side 813 and the oblique side 814 serve as the light scattering surface 821 may be obtained. In addition, in the case where it is configured so that only either the lateral side 813 or the oblique side 814 of one light guide plate portion 81 among the light guide plate portions 81 adjacent to each other in the Y-axis direction serves as the light scattering surface 821, the object subject to the scattering treatment is limited, thereby improving productivity.

In addition, in this embodiment, even though the configuration where the end surface at the long side 811 facing the light incident portion 88 is a flat surface is adopted, it is possible to adopt a configuration where the end surface at the long side 811 is a scattering surface or a reflecting surface, and in this case, the utilization efficiency of light propagating in the light guide plate 80 may be enhanced.

Second Embodiment

FIG. 5 is a diagram showing a planar configuration of a lighting device 8 according to a second embodiment of the invention. Even though the first embodiment adopts the local dimming method, this embodiment adopts the local dimming and also is an example of a scanning backlight which shifts the region to which illuminating light is emitted from the lighting device 8, coupled with the operation of scanning pixels in order with respect to the liquid crystal panel 10, as indicated by the arrow Y0. For this reason, in the following description, the first direction, the second direction and the third direction respectively correspond to the following directions:

the first direction=the X-axis direction,
the second direction=the Y-axis direction, and
the third direction=the Z-axis direction.

However, since the basic configuration of this embodiment is identical to the first embodiment, the same reference numbers are applied to common components and are not described in detail.

As shown in FIG. 5, in the lighting device 8 of this embodiment, compared with the first embodiment, the arrangement direction of the light guide plate portions 81 is rotated by 90°, and meanwhile, the number of the light guide plate portions 81 is increased. In more detail, the light guide plate 80 has a configuration where the plurality of light guide plate portions 81 (81a to 81h) having a trapezoidal planar shape where two sides facing each other in the X-axis direction have different lengths are arranged in parallel in the Y-axis direction, and the light emitting elements 89 are arranged in a one-to-one relationship with the light guide plate portions 81.

Here, the plurality of light guide plate portions 81 are arranged alternately in the Y-axis direction while reversing orientations in the X-axis direction. For this reason, among the plurality of light guide plate portions 81, every light guide plate portions 81 adjacent to each other have reversing orientations in the Y-axis direction. In addition, all of the plurality of light guide plate portions 81 have the same shape and include a lateral side 813 and an oblique side 814 orthogonal to the long side 811 and the short side 812. For this reason, if two light guide plate portions 81a and 81b adjacent to each other are arranged so that their oblique sides 814 adjoin each other, the light guide plate portions 81a and 81b becomes a rectangle extending toward the long side in the Y-axis direction. In addition, it is the same as the other light guide plate portions (the light guide plate portions 81c and 81d, the light guide plate portions 81e and 81f, and the light guide plate portions 81g and 81h). For this reason, the light guide plate 80 has a rectangular planar shape.

In this embodiment, the light guide plate portion 81 includes, for example, a thickness dimension of 1 mm and a length dimension of 51 mm in the X-axis direction, the long side 811 having a length of 15 mm, the short side 812 having a length of 4 mm. For this reason, the light guide plate has a planar size of 51 mm×76 mm.

When arranging the light emitting element 89 at the light guide plate 80 configured as above, in this embodiment, similar to the first embodiment, at any of the plurality of light guide plate portions 81, the end surface located at the short side 812 becomes the light incident portion 88, so that the light emission surface of the light emitting element 89 is oriented toward the light incident portion 88. In addition, with respect to the light guide plate portion 81, at the surface where the reflection sheet 187 is located, a scattering pattern is formed, so that the distribution of intensity of illuminating light emitted from the light guide plate portion 81 is made uniform regardless of the distance from the light emitting element 89. In addition, the plurality of light guide plate portions 81 are respectively made of independent resin plates, and the end surface corresponding to the lateral side 813 and the oblique side 814 becomes a light scattering surface 821 to which fine unevenness is added by means of scattering. For this reason, the light scattering surface 821 is installed at the space 82 between the light guide plate portions 81 adjacent to each other in the Y-axis direction. In this regard, both the end surface of the light guide plate portion 81 at the short side 812 regarded as the light incident portion 88 and the end surface at the long side 811 side, which faces the light incident portion 88, become flat surfaces.

In addition, in this embodiment, similar to the first embodiment, even though, when the light scattering surface 821 is provided to the space 82 between the light guide plate portions 81 adjacent to each other in the Y-axis direction, both the lateral side 813 and the oblique side 814 serve as the light scattering surface 821, it is also possible to adopt a configuration where the lateral side 813 or the oblique side 814 of one light guide plate portion 81 among the light guide plate portions 81 adjacent to each other in the Y-axis direction serves as the light scattering surface 821. In this configuration, since it is configured so that the light scattering surface 821 is used together between the light guide plate portions 81 adjacent to each other in the Y-axis direction, the same effects as when both the lateral side 813 and the oblique side 814 serve as the light scattering surface 821 may be obtained. In addition, in the case where it is configured so that only either the lateral side 813 or the oblique side 814 of one light guide plate portion 81 among the light guide plate portions 81 adjacent to each other in the Y-axis direction serves as the light scattering surface 821, the object subject to the scattering treatment is limited, thereby improving productivity. In addition, in this embodiment, similar to the first embodiment, even though the configuration where the end surface at the long side 811 side facing the light incident portion 88 is a flat surface is adopted, it is possible to adopt a configuration where the end surface at the long side 811 is a scattering surface or a reflecting surface, and in this case, the utilization efficiency of light propagating in the light guide plate 80 may be enhanced.

As described above, in this embodiment, the local dimming is adopted to improve the contrast of an image and promote low power consumption, and the scanning backlight method is adopted to promote low power consumption, so that the light guide plate portions 81 having a trapezoidal planar shape where two parallel sides facing in the X-axis direction (the first direction) have different lengths are arranged in the Y-axis direction (the second direction) while reversing orientations in the Y-axis direction. In addition, the light of the light source emitted from the light emitting element 89 is incident into the light guide plate portion 81 from the end surface of the light guide plate portion 81 located in the X-axis direction. For this reason, different from the case where an integrated light guide plate is used, it is possible to prevent the light of the light source from spreading too much, and so the emission intensity of illuminating light may be very suitably controlled at each region. In addition, if the scanning backlight method is adopted, afterimages or the like generated when a moving picture is displayed may be eased off in order to synchronize the scanning of the liquid crystal panel 10 and the scanning of the backlight.

In addition, the light emitting element 89 emits the light of the light source into the light guide plate portion 81 from the end surface of the light guide plate portion 81 located at the short side 812 side among two parallel sides of the light guide plate portion 81 facing each other in the X-axis direction. For this reason, in the light guide plate portion 81, it is possible to avoid the size of the end surface (the light incident portion 88) in the Y-axis direction where the light of the light source is incident increasing excessively in comparison to the size of the light emitting element 89 in the Y-axis direction. Therefore, even though the light emitting element 89 is not excessively separated from the light incident portion 88 of the light guide plate portion 81, the difference in incident intensity of the light of the light source is small between the region of the light guide plate portion 81 which faces the light emitting element 89 and a location deviated from the region in the Y-axis direction. Therefore, when the illuminating light is emitted from the light guide plate portion 81, in the vicinity of the light incident portion 88 of the light guide plate portion 81, the difference between the emission intensity of illuminating light from the region facing the light emitting element 89 and the emission intensity of illuminating light from a location deviated from the region in the Y-axis direction is small. Therefore, even though the plurality of light guide plate portions 81 extending in the X-axis direction are arranged in the Y-axis direction, the emission intensity of illuminating light may be made uniform in a state where the number of light guide plate portions 81 or light emitting elements 89 is relatively small and the dimension of the lighting device 8 in the X-axis direction is relatively small.

In addition, in this embodiment, since the light scattering surface 821 is installed at the space 82 between the light guide plate portions 81 adjacent to each other, a part of the light leaks from the light guide plate portions 81 to an adjacent light guide plate portion 81. For this reason, the same effects as in the first embodiment may be obtained; for example it is possible to suppress an abrupt change of the emission intensity of illuminating light at a border portion of adjacent light guide plate portions 81.

Third Embodiment

Figure 6A:
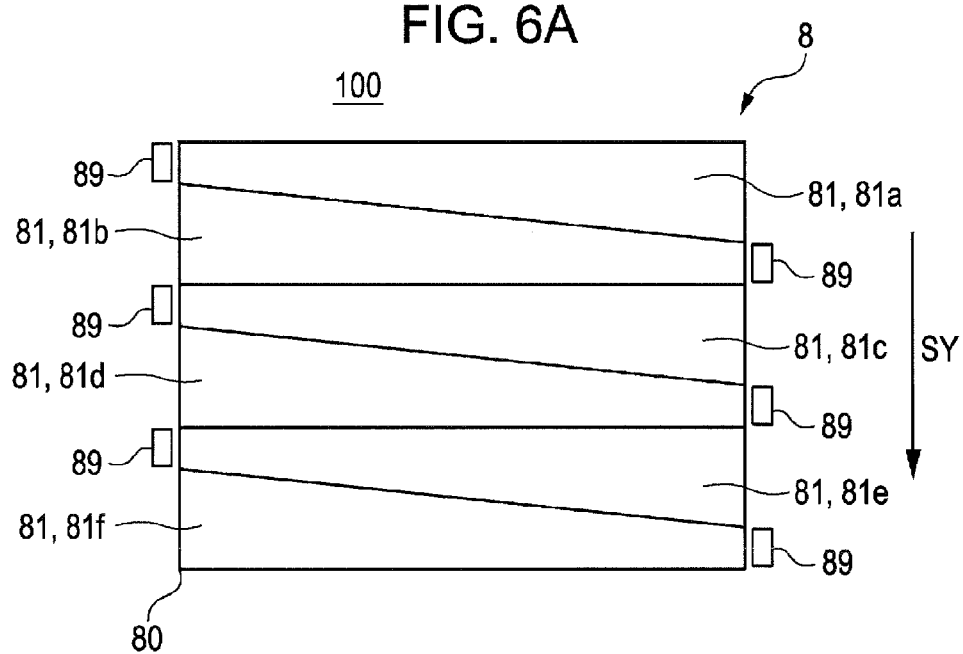
FIGS. 6A and 6B are diagrams showing a planar configuration of a lighting device according to a third embodiment of the invention.
Figure 6B:
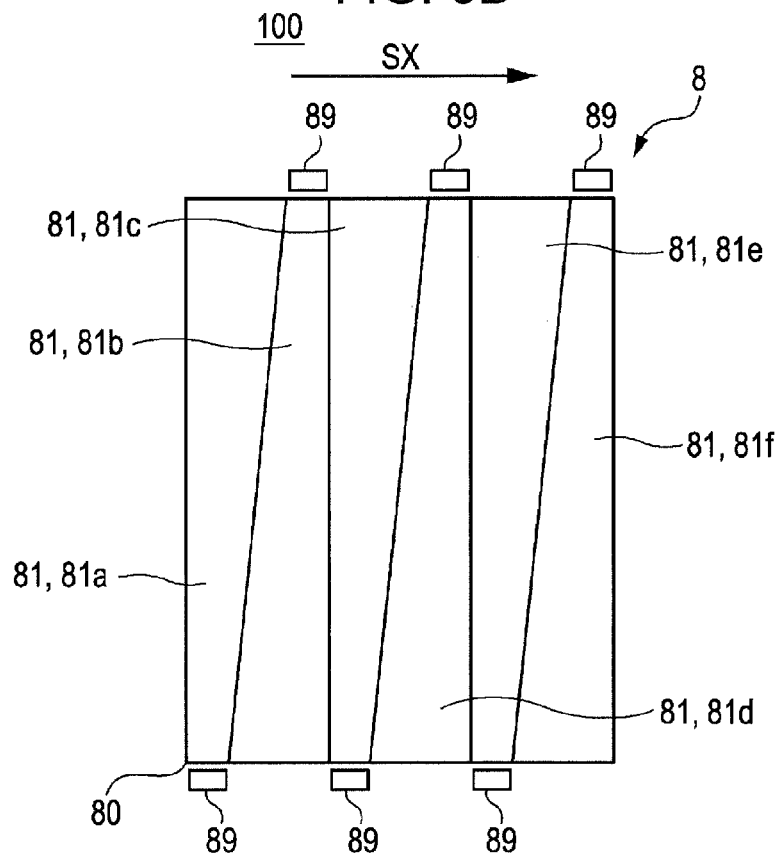

FIGS. 6A and 6B are diagrams showing a planar configuration of a lighting device 8 according to a third embodiment of the invention, where FIG. 6A is a diagram showing that the liquid crystal device 100 is used to be horizontally long and FIG. 6B is a diagram showing that the liquid crystal device 100 is used to be vertically long. In addition, since the basic configuration of this embodiment is identical to the first and second embodiments, the same reference numbers are applied to common components and are not described in detail.

As shown in FIG. 6A, in the liquid crystal device 100 having the lighting device 8 according to this embodiment, the image display region of the liquid crystal panel 10 is 3.5 inches diagonally and has 320×480 pixels. In addition, the light guide plate 80 has a size of 51 mm×75 mm and a thickness of 1 mm. In this embodiment, the light guide plate 80 of the lighting device 8 is configured so that the number of the light guide plate portions 81 is reduced by 6 from the light guide plate 80 according to the second embodiment. The liquid crystal device 100 having the lighting device 8 is used horizontally long, when TV moving picture or the like is displayed. In this horizontally long state, as indicated by the arrow SY, a backlight scans from the upper side to the lower side of the screen in the lighting device 8 of this embodiment, which is identical to the scanning direction of the liquid crystal panel 10. Therefore, afterimages or the like may be mitigated when a moving picture is displayed, and the local dimming effect may be obtained.

In the above configuration, as shown in FIG. 6B, if the liquid crystal device 100 is rotated by 90° to be vertically long, as indicated by the arrow SX, the backlight scans from the left side to the right side of the screen. In this case, since images in vertical frames frequently display text information or the like as still images, even though the backlight scans from the left side to the right side of the screen, problems such as afterimages do not easily occur.

First Modification Example of First to Third Embodiments

Figure 7A:
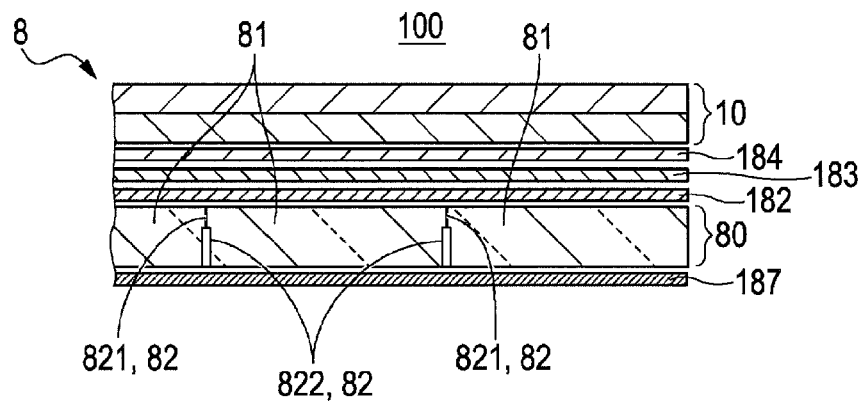
FIGS. 7A to 7C are diagrams showing a cross-sectional configuration of a lighting device according to a first modification example of the first to third embodiments of the invention.
Figure 7B:
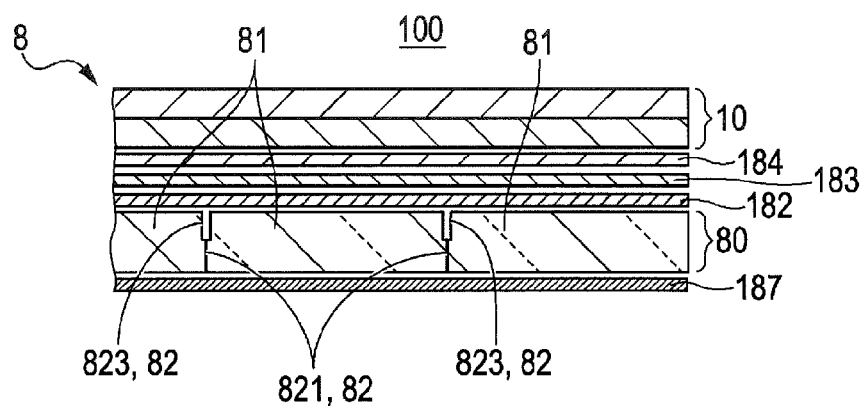
Figure 7C:
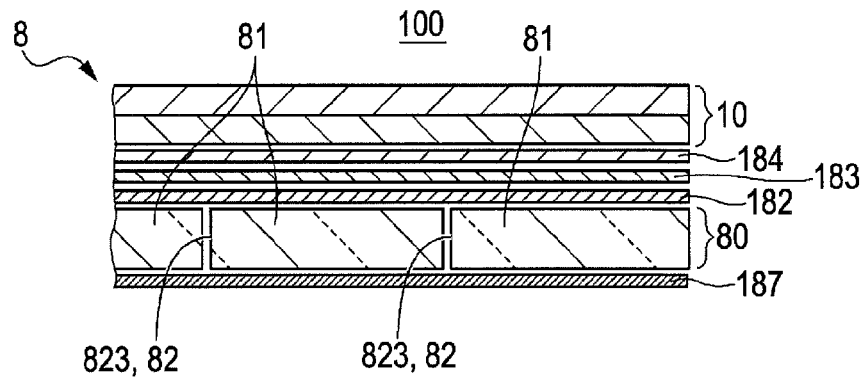

FIGS. 7A to 7C are diagrams showing a cross-sectional configuration of a lighting device 8 according to a first modification example of the first to third embodiments of the invention. In addition, since the basic configuration of this embodiment is identical to the first to third embodiments, the same reference numbers are applied to common components and are not described in detail.

Even though the plurality of light guide plate portions 81 are respectively made of independent resin plates so that the entire end surface corresponding to the lateral side 813 and the oblique side 814 becomes a light scattering surface 821 in the first to third embodiments, in this embodiment, as shown in FIG. 7A, in the space 82 between the light guide plate portions 81 adjacent to each other, the light scattering surface 821 is installed at a part of the light guide plate 80 in the thickness direction and the reflecting surface 822 is installed at the other part. In this embodiment, in the space 82 between the light guide plate portions 81 adjacent to each other, about ⅓ of the light guide plate 80 in the thickness direction from the light emitting surface 85 becomes the light scattering surface 821, and the other about ⅔ becomes the reflecting surface 822. The reflecting surface 822 is configured by providing a reflective layer made of aluminum or the like, but it may be implemented by a configuration where a part of the end surface of the light guide plate portion 81 is made of a mirror surface. In addition, the reflecting surface 822 may be, for example, installed at a side of the light emitting surface 85, or may be installed at a position in the middle of the light guide plate 80 in the thickness direction.

According to the above configuration, by adjusting a ratio occupied by the light scattering surface 821 and the reflecting surface 822, the intensity of light leaking to an adjacent light guide plate portion 81 and the intensity of light reflected by the reflecting surface 822 to return to the light guide plate portion 81 may be adjusted by means of the light scattering surface 821 from the light guide plate portion 81. For example, the leaked light may reach a region corresponding to 10 pixels to 20 pixels, with respect to an adjacent light guide plate portion 81, by means of the light scattering surface 821 from the light guide plate portion 81. Therefore, it is possible to suppress an abrupt change of the emission intensity of illuminating light with respect to the space (the border portion) 82 between the light guide plate portions 81 adjacent to each other, and the intensity of illuminating light emitted from the light guide plate portion 81 may be optimized.

In addition, in this embodiment, even though, when the light scattering surface 821 and the reflecting surface 822 are provided to the space 82 between the light guide plate portions 81 adjacent to each other, the light scattering surface 821 and the reflecting surface 822 are formed at both light guide plate portions 81 adjacent to each other in the Y-axis direction, it is also possible to install the light scattering surface 821 and the reflecting surface 822 at one light guide plate portion 81. In this configuration, since it is configured so that the light scattering surface 821 and the reflecting surface 822 are used together between the light guide plate portions 81 adjacent to each other in the Y-axis direction, the same effects as when the light scattering surface 821 and the reflecting surface 822 are provided at both light guide plate portions 81 adjacent to each other may be obtained. At this time, if the light scattering surface 821 is provided to one light guide plate portion 81 among the light guide plate portions 81 adjacent to each other in the Y-axis direction and the reflecting surface 822 is provided to the other light guide plate portion 81, the manufacturing process of the light guide plate 80 may be simplified.

In the light guide plate 80 shown in FIG. 7B, at the space 82 between the light guide plate portions 81 adjacent to each other, the light scattering surface 821 is installed at a part of the light guide plate 80 in the thickness direction, and a clearance 823 is provided at the other part. In this embodiment, in the space 82 between the light guide plate portions 81 adjacent to each other, about ½ of the light guide plate 80 in the thickness direction from the light emitting surface 85 becomes the clearance 823, and the other about ½ becomes the light scattering surface 821. The clearance 823 may be implemented by providing the stepped portion to the end surface of the light guide plate portion 81, and the inside of the clearance 823 is an air layer. In addition, the clearance 823 may be, for example, provided at a side where the reflection sheet 187 is located.

In the above configuration, reflection occurs at the interface between the end surface of the light guide plate portion 81 and the air layer in the clearance 823, and a part of the light is incident to an adjacent light guide plate portion 81 via the clearance 823. Therefore, by adjusting a ratio occupied by the light scattering surface 821 and the clearance 823, it is possible to adjust the intensity of light leaking from the light guide plate portion 81 to an adjacent light guide plate portion 81 and the intensity of light reflected on the interface between the end surface of the light guide plate portion 81 and the air layer in the clearance 823 to return to the light guide plate portion 81. Therefore, it is possible to suppress an abrupt change of the emission intensity of illuminating light with respect to the space (the border portion) 82 between the light guide plate portions 81 adjacent to each other, and the intensity of illuminating light emitted from the light guide plate portion 81 may be optimized.

Here, the region of the light guide plate portion 81 which serves as the clearance 823 is preferably a flat surface. According to this configuration, since light may be efficiently reflected, the efficiency of light utilization may be enhanced. In addition, even though, when the light scattering surface 821 and the clearance 823 are provided to the space 82 between the light guide plate portions 81 adjacent to each other, the light scattering surface 821 and the cutout which will serve as the clearance 823 are formed at both light guide plate portions 81 adjacent to each other in the Y-axis direction, it is also possible that the light scattering surface 821 and the cutout (the clearance 823) may be formed at one light guide plate portion 81. In this configuration, since the light scattering surface 821 and the clearance 823 are used together between the light guide plate portions 81 adjacent to each other in the Y-axis direction, the same effects as when the light scattering surface 821 and the clearance 823 are provided at both light guide plate portions 81 adjacent to each other may be obtained. At this time, if the light scattering surface 821 is provided to one light guide plate portion 81 among the light guide plate portions 81 adjacent to each other in the Y-axis direction and the cutout (the clearance 823) is provided to the other light guide plate portion 81, the manufacturing process of the light guide plate 80 may be simplified.

In the light guide plate 80 shown in FIG. 7C, the entire space 82 between the light guide plate portions 81 serves as the clearance 823. In this configuration, reflection occurs at the interface between the end surface of the light guide plate portion 81 and the air layer in the clearance 823, and a part of the light is incident to an adjacent light guide plate portion 81 via the clearance 823. Therefore, the intensity of light leaking from the light guide plate portion 81 to an adjacent light guide plate portion 81 and the intensity of light reflected on the interface between the end surface of the light guide plate portion 81 and the air layer in the clearance 823 to return to the light guide plate portion 81 may be adjusted. Therefore, it is possible to suppress an abrupt change of the emission intensity of illuminating light with respect to the space (the border portion) 82 between the light guide plate portions 81 adjacent to each other, and the intensity of illuminating light emitted from the light guide plate portion 81 may be optimized.

Here, the region of the light guide plate portion 81 which serves as the clearance 823 is preferably a flat surface. In this configuration, since light may be efficiently reflected, the efficiency of light utilization may be enhanced. In addition, among the light guide plate portions 81 adjacent to each other in the Y-axis direction via the clearance 823, the end surface of one light guide plate portion 81 may be provided with the light scattering surface, and the end surface of the other light guide plate portion 81 may be a flat surface.

Second Modification Example of First to Third Embodiments

Figure 8A:
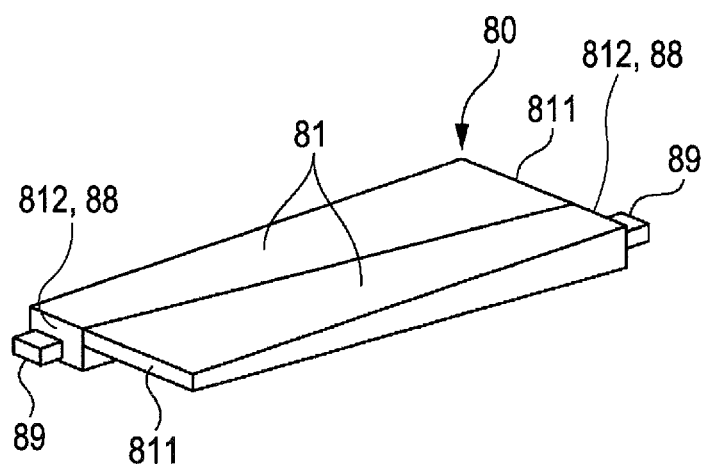
FIGS. 8A and 8B are diagrams showing an essential configuration of a lighting device according to a second modification example of the first to third embodiments of the invention.
Figure 8B:
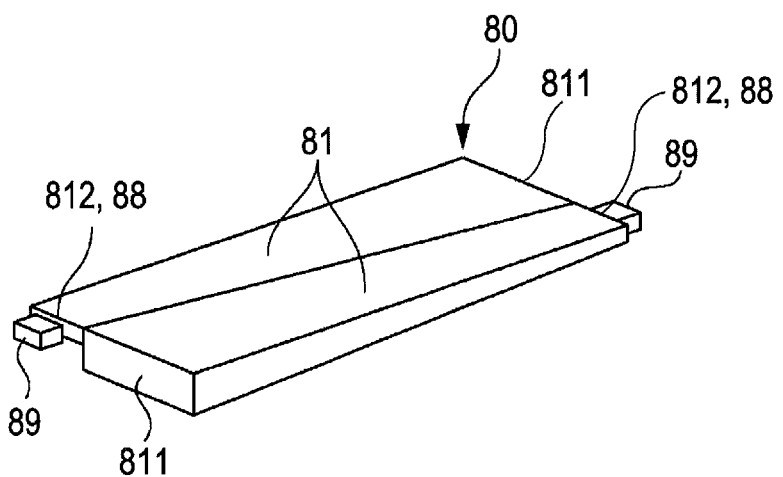

FIGS. 8A and 8B are diagrams showing an essential configuration of a lighting device according to a second modification example of the first to third embodiments of the invention. In addition, since the basic configuration of this embodiment is identical to the first to third embodiments, the same reference numbers are applied to common components and are not described in detail.

Even though the thickness of the light guide plate portion 81 is constant in the first to third embodiments, as shown in FIGS. 8A and 8B, the plurality of light guide plate portions 81 may adopt a configuration where the thickness dimension is continuously changed in the first direction (the direction which the long side 811 and the short side 812 face each other). Here, in the light guide plate 80 shown in FIG. 8A, the thickness dimension of the light guide plate portion 81 continuously increases from a side of the long side 811 toward a side of the short side 812. In this regard, in the light guide plate 80 shown in FIG. 8B, the thickness dimension of the light guide plate portion 81 continuously decreases from the long side 811 toward the short side 812.

In this configuration, in the case of the configuration shown in FIG. 8A, after the light of the light source emitted from the light emitting element 89 is incident to the light guide plate portion 81, the light may easily reach the front end side while keeping a sufficient intensity of light. Therefore, it has the advantage that the emission intensity of illuminating light emitted from the light guide plate portion 81 may be made uniform.

Other Embodiments

Even though the light guide plate portion 81 has the lateral side 813 and the oblique side 814 orthogonal to the long side 811 and the short side 812 in the above embodiments, it may have a trapezoidal shape having two oblique sides. Even though the light guide plate portions 81 having reverse orientations in the first direction are arranged alternately in the second direction in the above embodiments, for example, every two light guide plate portions 81 having reverse orientations in the first direction may be arranged in the second direction.

Example Loaded on the Electronic Apparatus

Figure 9A:
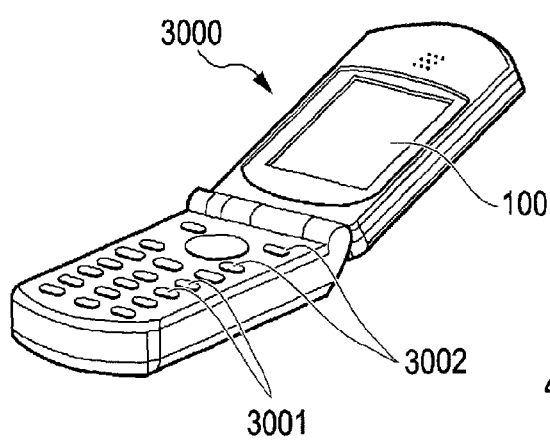
FIGS. 9A to 9D are diagrams showing an electronic apparatus having the liquid crystal device according to the invention.
Figure 9B:
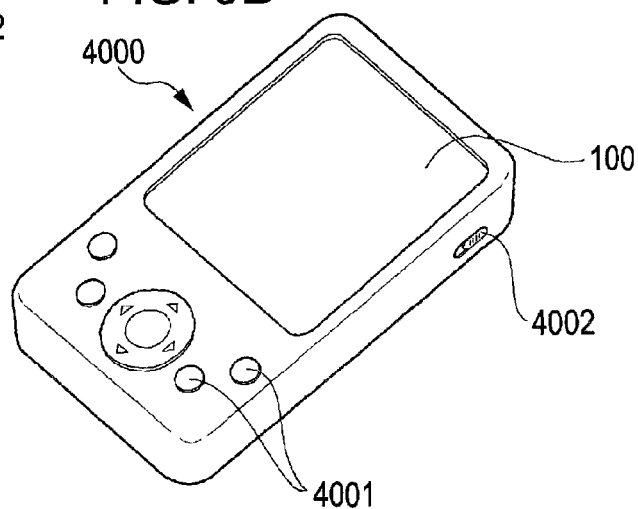

Next, an electronic apparatus to which the liquid crystal device 100 according to the above embodiment is applied will be described. FIG. 9A shows a configuration of a cellular phone 3000. The cellular phone 3000 includes a plurality of manipulation buttons 3001, a scroll button 3002, and the liquid crystal device 100 serving as a display unit. By manipulating the scroll button 3002, the image displayed on the liquid crystal device 100 is scrolled. FIG. 9B shows a configuration of an information portable terminal 4000. The information portable terminal 4000 includes a plurality of manipulation buttons 4001, a power switch 4002, and the liquid crystal device 100 serving as a display unit. If the power switch 4002 is manipulated, various kinds of information such as an address book and a schedule book are displayed.

Figure 9C:
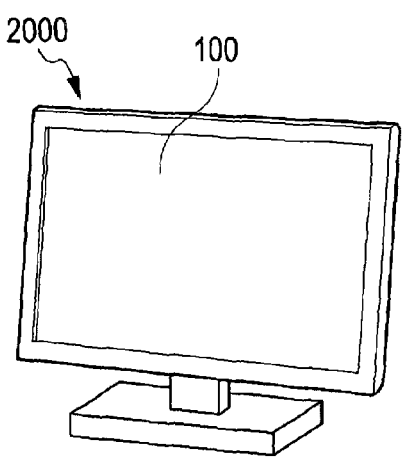
Figure 9D:
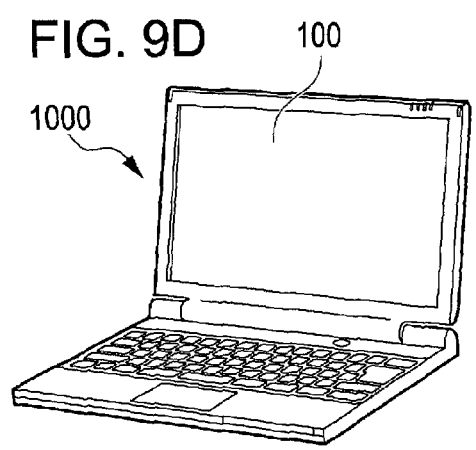
Figure 10A:
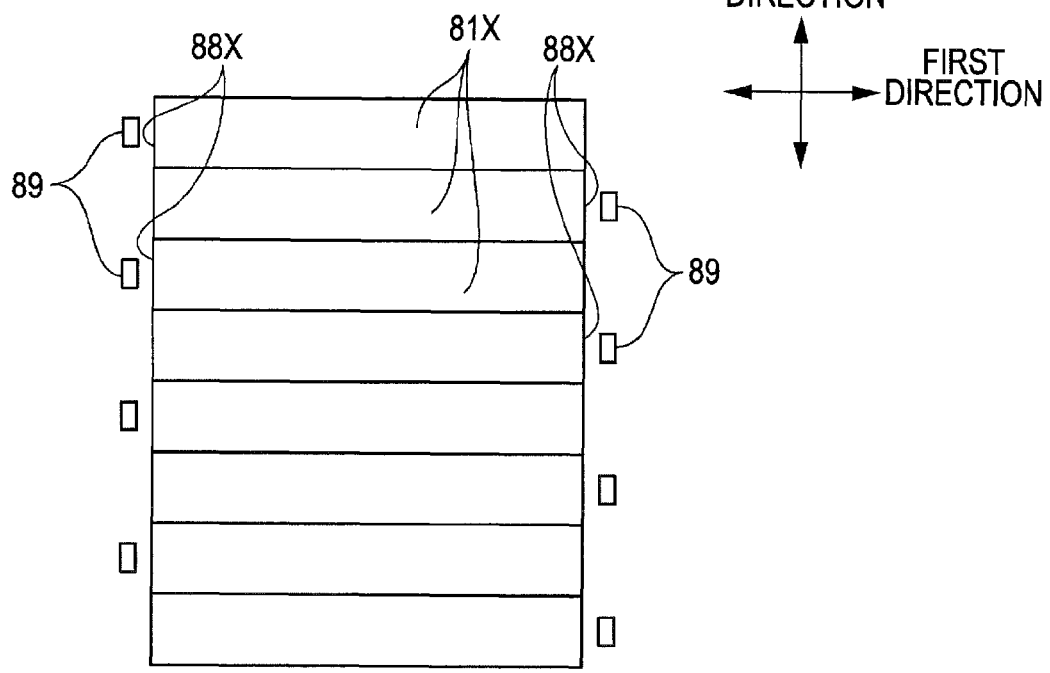
FIGS. 10A and 10B are a diagram showing a lighting device in the related art.
Figure 10B:
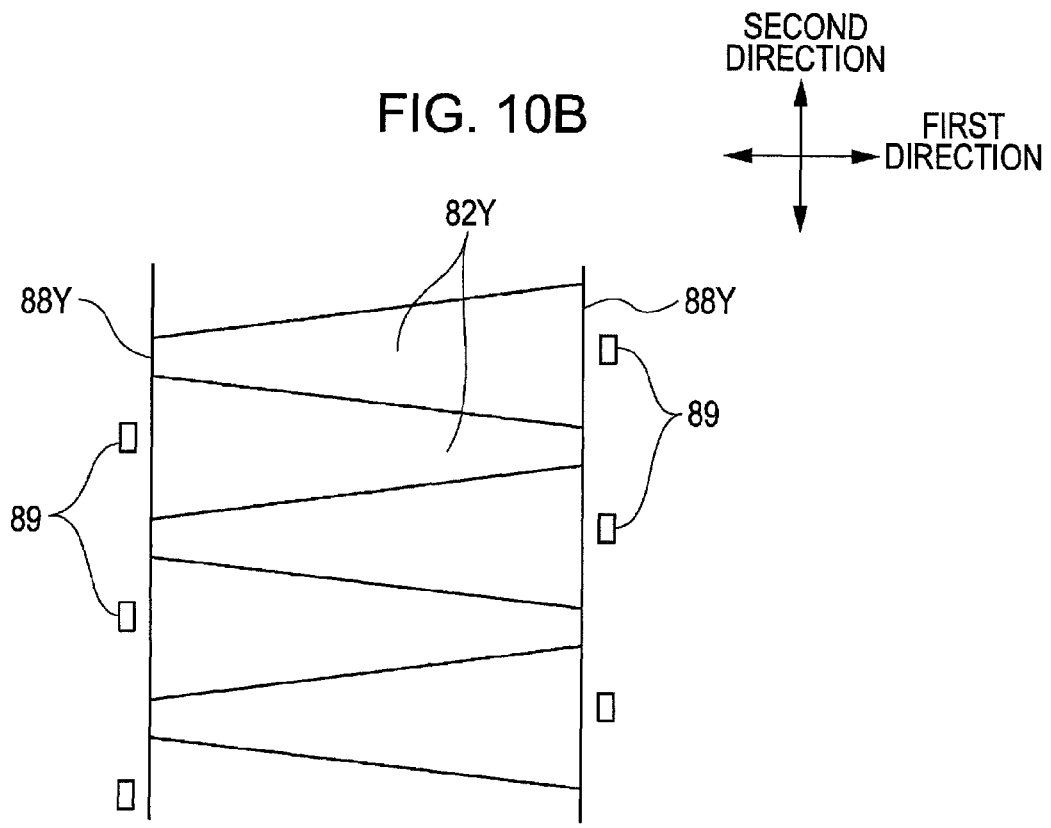

In addition, as the electronic apparatus to which the liquid crystal device 100 is applied, in addition to the electronic apparatus shown in FIGS. 9A and 9B, a liquid crystal TV 2000 shown in FIG. 9C and a display of a personal computer 1000 shown in FIG. 9D may be cited as examples. In addition, in addition to the electronic apparatus shown in FIGS. 9A to 9D, a car navigation device, a pager, an electronic notebook, a calculator, a word processor, a work station, a digital camera, an image phone, a POS terminal or the like may be used, and the liquid crystal device 100 may be applied thereto as a display unit of such various kinds of electronic apparatuses.

The entire disclosure of Japanese Patent Application No.: 2011-147092, filed Jul. 1, 2011, 2011-253714, filed Nov. 21, 2011, and 2011-253715, filed Nov. 21, 2011 are expressly incorporated by reference herein.

What is claimed is:
1. A lighting device, comprising:
 a first light emitting element and a second light emitting element;
 a first light guide plate including a first side surface and a second side surface that are parallel to each other and face each other in a first direction, a width of the second side surface being larger than a width of the first side surface, and a height of the second side surface being larger than a height of the first side surface, and a second light guide plate, positioned adjacent to the first light guide plate in a second direction that intersects the first direction viewed from a normal direction of the lighting device, and including a third side surface and a fourth side surface that are parallel to each other and face each other in the first direction, a width of the fourth side surface being larger than a width of the third side surface, and a height of the fourth side surface being larger than a height of the third side surface, wherein the first light emitting element is opposed to the first side surface and the second light emitting element is opposed to the third side surface, and the first light emitting element and the second light emitting element are controlled separately.

2. The lighting device according to claim 1, wherein the first light guide plate includes a fifth side surface and the second light guide plate includes a sixth side surface faced to the fifth side surface, and a light scattering layer is positioned between the fifth side surface and the sixth side surface.

3. The lighting device according to claim 1, wherein the first light guide plate includes a fifth side surface and the second light guide plate includes a sixth side surface faced to the fifth side surface, and a clearance is provided between the fifth side surface and the sixth side surface.

4. A liquid crystal display device comprising the lighting device according to claim 1, further comprising:

a liquid crystal panel disposed to overlap the first light guide plate at a first region of the liquid crystal panel and the second light guide plate at a second region of the liquid crystal panel, wherein the first light emitting element is controlled corresponding to a first image displayed at the first region of the liquid crystal panel and the second light emitting element is controlled corresponding to a second image displayed at the second region of the liquid crystal panel.

5. An electronic apparatus comprising the liquid crystal display device according to claim 4.

6. A lighting device, comprising:

a first light emitting element;

a first light guide plate including a first side surface and a flat second side surface that are parallel to each other and face each other in a first direction, a third side surface, a fourth side surface opposite to the third side surface, the third side surface and the fourth side surface being disposed between the first side surface and the second side surface and being disposed adjacent to the first side surface and the second side surface, a fifth side surface, and a sixth side surface opposite to the fifth side surface, the fifth side surface and the sixth side surface being disposed between the first side surface and the second side surface and adjacent to the first side surface and the second side surface and being disposed between the third side surface and the fourth side surface and adjacent to the third side surface and the fourth side surface, wherein a width of the second side surface is larger than a width of the first side surface, and a height of the second side surface is larger than a height of the first side surface, the third side surface, the fourth side surface, the fifth side surface and the sixth side surface have trapezoidal planar shape, and the first light emitting element is opposed to the first side surface, and a planar area of the portion of the first light emitting element facing the first side surface is smaller than an area of the first side surface.

7. The lighting device according to claim 6, wherein the shape of at least one of the third and fourth side surfaces differs from the shape of at least one of the fifth and sixth side surfaces.

* * * * *